United States Patent [19]

Li et al.

[11] Patent Number: 5,454,950
[45] Date of Patent: Oct. 3, 1995

US005454950A

[54] METHOD AND APPARATUS FOR REVERSE-INJECTION WET OXIDATION, SINTERED MATERIAL CATALYTIC REACTION, SINTERED MATERIAL FILTRATION AT SUPERCRITICAL CONDITIONS, SINTERED MATERIAL GAS SEPARATION, AND HIGH TEMPERATURE PRESSURIZATIION

[75] Inventors: Lixiong Li; Earnest F. Gloyna, both of Austin, Tex.

[73] Assignee: Board of Regents, The University of Texas, Austin, Tex.

[21] Appl. No.: 184,951

[22] Filed: Jan. 18, 1994

Related U.S. Application Data

[62] Division of Ser. No. 743,520, Aug. 9, 1991, abandoned.

[51] Int. Cl.$^6$ ..................................................... C02F 1/72
[52] U.S. Cl. ............................................ 210/636; 210/721
[58] Field of Search .................................. 210/721, 761, 210/805, 762, 763, 636

[56] References Cited

U.S. PATENT DOCUMENTS

| | | | |
|---|---|---|---|
| 2,944,396 | 7/1960 | Barton et al. | 60/39.05 |
| 3,449,247 | 6/1969 | Bauer | 210/63 |
| 3,464,885 | 9/1969 | Land et al. | 162/17 |
| 3,606,999 | 9/1971 | Lawless | 23/1 |
| 3,853,759 | 12/1971 | Titmas | 210/63 |
| 3,900,300 | 8/1975 | Lehman | 55/184 |
| 3,912,626 | 1/1975 | Ely et al. | 210/50 |
| 3,938,972 | 2/1976 | Sugimura | 55/440 |
| 4,141,829 | 2/1979 | Thiel et al. | 210/63 |
| 4,215,094 | 7/1980 | Inao et al. | 423/123 |
| 4,217,218 | 8/1980 | Bauer | 210/63 |
| 4,221,577 | 9/1980 | Lowrie | 55/392 |
| 4,229,296 | 10/1980 | Wheaton et al. | 210/758 |
| 4,272,383 | 6/1981 | McGrew | 210/741 |

(List continued on next page.)

FOREIGN PATENT DOCUMENTS

| | | |
|---|---|---|
| 53091093 | 8/1978 | Japan. |
| US92/06459 | 12/1992 | WIPO. |

OTHER PUBLICATIONS

Chowdhury et al., "Catalytic Wet Oxidation of Strong Waste Waters", AIChE Symp. 151(71):46–58, 1975.

Freeman, "Innovative Thermal Hazardous Organic Waste Treatment Processes." Noyes Publications: Park Ridge, N.J. pp. 12–33, 1985.

Gloyna, "Supercritical Water Oxidation... Deep Well Technology for Toxic Wastewaters and Sludges," Technical Report, The University of Texas at Austin, 1989.

Imamura et al., "Wet Oxidation of Acetic Acid Catalyzed by Co–Bi Complex Oxides", Ind. Eng. Chem. Prod. Res. Dev., 21(4):570–575, 1982.

Lee et al., "Efficiency of Hydrogen Peroxide and Oxygen in Supercritical Water Oxidation of 2,4–Dichlorophenol and Acetic Acid", The Journal of Supercritical Fluids, 3:249–255, 1990.

Lu et al., "Selective Particle Deposition in Crossflow Filtration", Sep. Sci. and Technol., 24(7&8):517–540, 1989.

(List continued on next page.)

Primary Examiner—Frank Spear
Attorney, Agent, or Firm—Arnold White & Durkee

[57] ABSTRACT

A system for effective utilization of reaction heat and in situ separation of solid and gaseous products in wet oxidation of waste and wastewater. This invention does not require special preheaters for preheating feed streams, therefore reducing the possibility of scale and char formation in the heat exchange zone. The cold feed stream is introduced into the reactor with part of the effluent which has been recycled through a high temperature pumping means to form a hot, near critical oxidant-containing mixture. The cold feed is directly heated up by the oxidant-containing mixture. The reaction mixture is separated by in situ crossflow filtration elements, including sintered material. Catalyzed reactions and sintered material gas separation are also described.

9 Claims, 3 Drawing Sheets

U.S. PATENT DOCUMENTS

| | | | |
|---|---|---|---|
| 4,292,953 | 10/1981 | Dickinson | 126/263 |
| 4,326,957 | 4/1982 | Rosenberg | 210/436 |
| 4,338,199 | 6/1982 | Modell | 210/721 |
| 4,370,223 | 1/1983 | Bose | 208/125 |
| 4,377,066 | 3/1983 | Dickinson | 60/39.05 |
| 4,378,976 | 4/1983 | Rush . | |
| 4,380,960 | 4/1983 | Dickinson | 110/347 |
| 4,384,897 | 5/1983 | Brink | 127/37 |
| 4,460,628 | 7/1984 | Wheaton et al. | 427/214 |
| 4,543,190 | 9/1985 | Modell | 210/761 X |
| 4,564,458 | 1/1986 | Burleson | 210/747 |
| 4,593,202 | 6/1986 | Dickinson | 290/54 |
| 4,594,164 | 6/1986 | Titmas | 210/741 |
| 4,668,256 | 5/1987 | Billiet et al. | 55/219 |
| 4,698,157 | 10/1987 | Gillot | 210/496 |
| 4,714,032 | 12/1987 | Dickinson | 110/347 |
| 4,721,575 | 1/1988 | Binning et al. | 210/761 |
| 4,733,852 | 3/1988 | Glasgow et al. | 266/227 |
| 4,767,543 | 8/1988 | Chornet et al. | 210/759 |
| 4,792,408 | 12/1988 | Titmas | 210/747 |
| 4,793,153 | 12/1988 | Hembree et al. | 62/476 |
| 4,822,394 | 4/1989 | Zeigler | 62/17 |
| 4,822,497 | 4/1989 | Hong et al. | 210/721 |
| 4,861,484 | 8/1989 | Lichtin et al. | 210/638 |
| 4,861,497 | 8/1989 | Welch et al. | 210/759 |
| 4,872,890 | 10/1989 | Lamprecht | 55/323 |
| 4,880,440 | 11/1989 | Perrin | 55/16 |
| 4,891,139 | 1/1990 | Zeigler et al. | 210/747 |
| 4,898,107 | 2/1990 | Dickinson | 110/346 |
| 4,936,990 | 6/1990 | Brunsell et al. | 210/331 |
| 4,968,328 | 11/1990 | Duke | 55/1 |
| 4,983,296 | 1/1991 | McMahon et al. | 210/603 |
| 5,009,857 | 4/1991 | Haerle | 422/180 |
| 5,011,614 | 4/1991 | Gresser et al. | 210/761 |
| 5,053,142 | 10/1991 | Sorensen et al. | 210/742 |
| 5,057,220 | 10/1991 | Harada et al. | 210/605 |
| 5,057,231 | 10/1991 | Mueller et al. | 210/761 |
| 5,075,017 | 12/1991 | Hossain et al. | 210/761 |
| 5,106,513 | 4/1992 | Hong | 210/759 |
| 5,133,877 | 7/1992 | Rofer et al. | 210/761 |
| 5,183,577 | 2/1993 | Lehmann | 210/761 |
| 5,192,453 | 3/1993 | Keckler et al. | 210/761 |
| 5,221,486 | 6/1993 | Fassbender | 210/757 |
| 5,232,604 | 8/1993 | Swallow et al. | 210/759 |
| 5,232,605 | 8/1993 | Baur et al. | 210/761 |
| 5,240,619 | 8/1993 | Copa et al. | 210/752 |
| 5,250,193 | 10/1993 | Sawicki et al. | 210/761 |
| 5,252,224 | 10/1993 | Modell et al. | 210/695 |

OTHER PUBLICATIONS

Mahlman et al., "Cross–Flow Filtration in Physical Chemical Treatment of Municipal Sewage Effluents", Oak Ridge Natl. Lab. Technical Report, EPA/600/2–76/925, Feb. 1976.

Modell et al., "Supercritical Water . . . Testing Reveals New Process Holds Promise", *Solid Wastes Management*, Aug. 1982.

Murkes, "Low–shear and High–shear Cross–flow Filtration", *Filtration and Separation*, 23(6):364–365, 1986.

Murkes et al., *Crossflow Filtration: Theory and Practice*, John Wiley & Sons: N.Y., 1988.

Opatken, "Aqueous–Phase Oxidation of Sludge Using the Vertical Reaction Vessel System", EPA/600/2–87/022, Mar. 1987.

Perona et al., "A Pilot Plant for Sewage Treatment by Cross–Flow Filtration", Oak Ridge Natl. Lab. Technical Report ORNL–TM–4659, Oct. 1974.

Shapira et al., "Removal of Heavy Metals and Suspended Solids from Battery Wastewaters: Application of Hydroperm Cross–flow Microfiltration", Gen. Battery Corp. Report EPA/600/2–81/147, Aug.1981.

Thomason et al., "Supercritical Water Destruction of Aqueous Wastes", *Hazardous Waste*, 1(4) :453–467, 1984.

Teletzke, "Wet Air Oxidation", *Chem. Eng. Prog.*, 60(1) :33–38, 1964.

Yang et al., "Homogeneous Catalysis in the Oxidation of p–Chlorophenol in Supercritical Water", *Ind. Eng. Chem. Res.*, 27(1):2009–2014, 1988.

Zimmermann, "New Waste Disposal Process", *Chem. Eng.*, pp. 117–220, Aug. 1958.

Jacobs et al., "Phase Segregation", *Handbook of Separation Process Technology*, published by John Wiley & Sons, 1987.

Stone & Webster Engineering Corp., "Assessment and Development of an Industrial Wet Oxidation System for Burning Waste and Low Grade Fuels", Final Report, Work Performed Under contract DE—FC07 881D12711, Prepared for U.S. Department of Energy, Sep. 1989.

Todheide et al., "Das Zweiphasengebiet und die kritische Kurve im system Kohlendioxid–Wasser bis zu Drucken von 3500 bar," *Zeitschrift fur Physikalischo Chemie Neue Folge*, Bd. 37(8):387–401, 1963.

Zimmermann et al., "The Zimmermann Process and Its Applications in the Pulp and Paper Industry", TAPPI, 43(8):710–715, 1960.

Keng—Chen Chang et al., "Supercritical Water Oxidation of Acetic Acid by Potassium Permanganate", *J. of Hazardous Materials*, 32:001–012, 1992.

Yoshiaki Harada, "Wet Catalytic Oxidation Process for Wasewater Treatment", *Abstract* (1991).

Sellchiro Imamura et al., "Wet Oxidation of Ammonia Catalyzed by Cerium–Based Composite Oxides", *Ind. Eng. Chem. Prod. Res. Dev.*, 24(1):75–80, 1985.

Lei Jin et al., "The Effect of Supercritical Water on the Catalytic Oxidation of 1–4–Dichlorobenzene", presented at AIChE Spring Meeting, Orlando, Fl. Mar. 19–22, 1990.

Dong—Soo Lee et al., "Efficiency of $H_2O_2$ in Supercritical Water Oxidation of 2,4–Dichlorophenol and Acetic Acid", presented at AIChE Spring Meeting, Orlando Fla., Mar. 18–22, 1990.

Teletzke et al., "Components of Sludge and Its Wet Air Oxidation Products, " *Journal WPCF*, 39(6):994–1005, 1967.

Conditt and Sievers, "Microanalysis of Reaction Products in Sealed Tube Wet Air Oxidations by Capillary Gas Chromatography, " *Anal. Chem.*, 56:2620–2622, 1984.

McGinnis et al., "Conversion of Biomass into Chemicals with High Temperature Wet Oxidation, " *Ind. Eng. Chem. Prod. Res, Dev.*, 22(4):633–6365, 1984.

Baker, et al., "Membrane Separation Systems –A Research & Development Needs Assessment, " *Department of Energy Membrane Separation Systems Research Needs Assesment Group, Final Report*, II, Mar. 1990.

Urusova, "Phase Equilibria in the Sodium Hydroxide–Water and Sodium Chloride–Water Systems at 350–550°, ", *Russian Journal of Inorganic Chemistry*, 19(3):450–454, 1974.

Valyashko, "Phase Equilibria in Water–Salt Systems: Some Problems of Solubility at Elevated Temperature and Pressure, " *High Temperature High Pressure Electrochemistry in Aqueous Solutions*. National Association of Corrosion Engineers, 4:153–157, 1976.

Armellilni and Tester, "Salt Separation During Supercritical Water Oxidation of Human Metabolic Waste: Fundamental Studies of Salt Nucleation and Growth, " *Society of Automotive Engineers, Inc.* pp. 189–203, 1990.

Dell'Orco et al., "The Solubility of 1:1 Nitrate Electrolytes in Supercritical Water", *Los Alamos National Lab Report,*

LA-UR-92-3359, pp. 1-17, 1992.

Martynova, "Solubility of Inorganic Compounds in Subcritical and Supercritical Water," *High Temperature High Pressure Electrochemistry in Aqueous Solutions*. National Association of Corrosion Engineers, 4:131-138, 1976.

Armellini and Tester, "Solubilities of Sodium Chloride and Sodium Sulfate in Sub-and Supercritical Water Vapor, " AIChE National Meeting, Los Angeles, Calif., Nov. 17-22, 1991, pp. 1-5.

METHOD AND APPARATUS FOR REVERSE-INJECTION WET OXIDATION, SINTERED MATERIAL CATALYTIC REACTION, SINTERED MATERIAL FILTRATION AT SUPERCRITICAL CONDITIONS, SINTERED MATERIAL GAS SEPARATION, AND HIGH TEMPERATURE PRESSURIZATION

This is a divisional of copending application Ser. No. 07/743,520 filed Aug. 9, 1991, now abandoned.

1. Field of the Invention

This invention generally relates to detoxification of wastewaters containing dissolved and/or suspended solids. Generally speaking, cold oxidant-containing fluid is directly heated by a hot recycling fluid, and mixed with a cold waste fluid which contains compounds to be oxidized. Solid and gaseous products may be separated in situ by crossflow filtration attachments. Sintered materials may be used as filter, gas separation, or catalyst elements. Thermal energy generated by the process may be recovered. A novel high temperature pumping means is also described.

2. Description of the Prior Art

The concept of wet oxidation of wastewater and sludge has been used since the 1960s. The need for complete and effective destruction of hazardous waste materials resulted in further investigation of wet oxidation at reaction conditions near the supercritical point of water (about or above 705° F. (374° C.) and about or above 3205 psia (221 bar)). It has been demonstrated in lab-scale tests that supercritical water oxidation is a viable waste treatment alternative to meet new environmental regulations. The growing interest and demand for wet oxidation requires that a practical process and apparatus be developed to apply wet oxidation to waste and wastewater treatment.

Current literature and practice have taught that the thermal energy carried in the reactor effluent may be used to heat the incoming feed through heat exchangers located either outside or inside of the reaction vessel. For example, one known process utilizes external heat exchangers with a subsurface (i.e. underground) vertical reaction vessel process. Another known process utilizes internal heat exchangers. Other similar subsurface concentric tube reactor processes have been described. A problem with the heat utilization systems presently used is that scale formation in heat exchangers and/or heat exchange zones is often fast and severe. One cause of the scale formation is that the wastewater or sludge in the feed is relatively slowly heated, allowing time for scale products to form. Cleaning of the scale in heat exchange units requires service time and additional costs. Scale formation may also cause localized corrosion.

Conventional practice for removing residue solids in wet oxidation reactor vessels has been to shut down the wet oxidation system, completely drain the reactor, and then physically remove the solids. One known method periodically removes solids from a wet oxidation reactor, with only a temporary suspension of feed to the plant. This method apparently works without draining the entire liquid portion of the reactor contents, and without having to cool the reactor contents. Other systems use a solid separation apparatus in a two zone pressure vessel wherein precipitates and other solids fall or are sprayed from a supercritical temperature superzone into a lower temperature subzone. The feed material may comprise various waste products which are subsequently oxidized in the superzone. The resultant brine or slurry at the lower temperature subzone of the vessel is removed via a pipe.

Crossflow filtration has been used for removal of heavy metals and suspended solids from battery wastewaters. Lab-scale and pilot plant studies have also treated municipal sewage effluent by crossflow filtration. These studies, however, have been conducted at relatively low temperatures and pressures, and little, if any, information on crossflow filtration under high pressure and high temperature conditions is known.

Relatively little is also known about the use of catalysts for supercritical wet oxidation processes. The difficulty and cost of operating at supercritical conditions has deterred supercritical catalyst studies.

In the past, oxidants have been introduced in wet oxidation processes by either (1) premixing the oxidant-containing fluid and the compound to be oxidized, or (2) injecting the compound to be oxidized or the oxidant-containing fluid at various locations in heat exchange or reaction zones. Both types of processes tend to produce scale and/or char in the reactor because of lack of oxidant available (at reaction conditions) to the compound to be oxidized. In process (1), the oxidant tends to degrade or react before reaction conditions are reached (either because of instability of the oxidant, or because of reaction between the oxidant and the compound to be oxidized). Thus the amount of oxidant available when the mixture reaches reaction conditions is reduced, causing scale and/or char formation due to insufficient oxidation of the compounds to be oxidized at reaction conditions. In process (2), insufficient mixing often allows some of the compounds to be oxidized to reach reaction conditions prior to contacting the oxidant, thus again causing scale and/or char formation due to insufficient oxidation of the compounds to be oxidized at reaction conditions.

In addition to the above problems, high temperature and pressure reactor system development has been hindered because there presently is no known equipment for pumping fluids at supercritical or near-supercritical conditions wherein the equipment will not be damaged by those conditions in a short amount of time.

SUMMARY OF THE DISCLOSURE

This invention, in a general aspect, relates to a system of treating a feed stream comprising water containing organic or other oxidizable matter with an oxidant stream under supercritical conditions for water to oxidize the oxidizable matter. The resulting reaction fluid product stream is preferably filtered and passed in indirect heat exchange with fluids in the reaction zone (i.e., supercritical conditions) or entering the reaction zone. Following such heat exchange, the reaction fluid product stream is cooled sufficiently to enable hot liquid components to be removed from the reaction fluid. Following such removal, a portion of the reaction fluid (primarily water) is recycled and mixed with the oxidant-containing fluid entering the reaction zone. This hot recycle fluid thus preheats the oxidant-containing fluid prior to such fluid contacts the feed fluid in the reactor.

The process of the invention is potentially autogenic (i.e. self-sustaining) if enough heat produced from the reaction is transferred to the feed and oxidant mixture to bring that mixture to reaction conditions. The amount of heat produced from the reaction is dependent on the heat content of the components in the feed fluid. The type and concentration of the components in the feed fluid to be oxidized may be adjusted to make the process autogenic (see Example 2 below). Heat is extracted from the reaction fluid product stream to heat not only the reaction zone, but also fluids entering the reaction zone. Concomitant with the heat extraction, water contained in the reaction fluid product stream is condensed, separated, and recycled to mix with and preheat the oxidant stream. Preheating of the oxidant stream, coupled with intense heating of the reaction zone, results in very rapid heating of the feed stream to reaction conditions. This rapid heating of the feed stream, in turn, greatly reduces charring and undesirable reactions of the oxidizable material in the feed stream.

In a preferred aspect of the invention, the hot product stream is filtered through a sintered filter to remove particulates from the product stream. The filter preferably comprises sintered metal, and arranged such that particulates may fall or otherwise be dislodged from the filter and collected. It is believed that the surface of sintered filters, especially sintered metal filters, is particularly well suited for the removal of such particulates.

The method of the invention comprises the steps of mixing a recycle fluid with a first oxidant-containing fluid, and then reacting that mixture with a cold feed fluid that comprises a compound to be oxidized. This reaction process is referred to as a "reverse-injection" process because the feed is injected to a hot oxidant-containing fluid to heat the feed, instead of slowly heating the feed via heat exchangers or other heating equipment. "Cold," as used in this specification, only reflects that the fluid being described has not been preheated. The terms "feed fluid" or "feed stream," as used in this specification, may comprise waste and waste water streams, as well as other gaseous, liquid, and solid streams that comprise a compound to be oxidized. The compound to be oxidized may be organic or inorganic.

The reaction generally takes place at subcritical conditions but accelerates significantly when supercritical conditions are reached. Hence the terms "pre-reaction fluid" and "reaction fluid" reflect the location of the fluid in the reactor, as reflected by the position of the fluid in reference to the supercritical zone (i.e., the zone of the reactor at supercritical conditions for water). The exact location of the supercritical zone in the reactor may change, depending on reactor conditions and the feed components. Preferably the process and apparatus are designed such that the supercritical zone is at or near the point that the feed fluid is added to the reactor.

If a fluid is travelling to the supercritical zone, it is "pre-reaction fluid." Generally the pre-reaction fluid comprises the recycle fluid and the oxidant-containing fluid. If the fluid is in or has left the supercritical zone, it is "reaction fluid." Further embodiments of the invention include means to cause heat transfer between: (1) the pre-reaction fluid; and (2) the reaction fluid.

The reactor may be arranged to provide for heat transfer to the pre-reaction fluid both before and after the feed fluid is added. Preferably, this heat transfer means is an indirect heating exchanger, such as a shell and tube heat exchanger. Other heat transfer means may also be used to transfer heat in this invention— e.g., injection of hot fluids, conduction heating, or direct fire heating to the outside of the equipment. Further heat may also be recovered from the reaction fluid by heat exchange between that fluid and a heat recovery unit.

Solids or gases may also be separated from the reaction fluid, either before, during or after the reaction using a crossflow filtration attachment generally comprising a filter element and other auxiliary elements. Preferably the reaction fluid is cooled and the reactor comprises means to segregate the gas and liquid in the reactor prior to contacting the gas with a sintered material separation means. The filter element may comprise sintered materials. "Sintered materials" in this context means porous materials made by sintering. "Sintering" is the agglomeration of metal, earthy powders, or other materials at temperatures below the melting point (usually by using heat and pressure to decrease the total surface area of the materials). The pores in the filter element allow reaction fluid to permeate through the element. A solids pressure letdown line may be utilized in conjunction with the filtration attachment to rid the system of solids. Sintered materials may also be used as a catalyst for the reaction.

Materials such as metals and/or alloys, ceramics, or metal oxides with or without a noble or transition metal coating may be used for the sintered materials. Manganese oxide, cerium oxide, platinum, ruthenium, or mixtures thereof may be especially effective as sintered materials. The sintered materials may be incorporated into cylindrical shapes, such as pipes and tubes, or other geometric forms.

In addition to the above, this invention also describes a novel system of increasing the pressure of a high temperature fluid such as the recycle fluid. This method includes a reciprocating piston arrangement coupled to a dual check valve arrangement that allows low temperature recycle fluid to contact the piston. A cooling means preferably separates the piston from the recycle fluid so that preferably only lower temperature fluid contacts the piston. The low temperature fluid is pressurized and then contacts with the recycle fluid to pressurize the hot recycle fluid into the reactor.

It is accordingly a general object of this invention to provide a method for improving wet oxidation of wastewater containing dissolved and/or suspended solids. In one aspect, the invention provides a method and apparatus for effective utilization of the reaction heat. In another aspect, it provides a method for heating feed compounds in a supercritical reactor without using a conventional heat exchanger arrangement (i.e., the feed compounds are primarily heated by direct mixing with hot oxidant-rich fluid, rather than by heating with conventional heat exchangers). In still another aspect, the invention provides a method and apparatus for in situ (i.e. in the reactor) separation of residue solids and gases. In yet another aspect, it provides a better and safer method for introducing oxidants into the reactor vessel. It is a feature of the invention that it provides a method and apparatus for catalytically enhancing wet oxidation. Another feature of the invention is that it provides a novel method of increasing high temperature fluid pressure without directly contacting hot recycle fluid with the pressurization means.

DETAILED DESCRIPTION OF THE PREFERRED EMBODIMENTS

The process flow is briefly described with reference to FIG. 1. A portion of the reaction fluid from the reactor is recycled into the reactor 10 from line 6 to line 1. A pressurization means 14 is used to pressurize the recycle fluid so that it will flow into the reactor 10. The pressurization means 14 (schematically shown in FIG. 1) may comprise the dual check and piston arrangement shown in FIG. 2 (see description below). The recycle fluid tends to primarily comprise water. The recycle fluid (through line 1) and an oxidant-containing fluid (through line 2) form a mixture which is then preferably heated by reaction fluid in a counter-current heat exchanger 12. Heat exchanger 12 is preferably integral to reactor 10.

The "oxidant-containing fluid," as defined herein, may comprise any gaseous, liquid or solids stream that comprises an oxidant. Typically the oxidant-containing fluid is an aqueous stream comprising dissolved oxygen or air. Other fluids comprising oxidants (e.g., liquid hydrogen peroxide) may be used.

As the mixture flows in the annular flow chamber (i.e. the premix section) of the reactor it is heated. Either before or after the mixture reaches supercritical conditions for water, it is then further mixed with a feed fluid (which is introduced through line 3 and comprises compounds to be oxidized) to form a reaction fluid. The compounds to be oxidized typically comprise organic wastes, hazardous wastes, and/or waste water. Additional oxidant(s) or a second feed fluid may be introduced through line 4, if needed.

A major advantage of the system described above is that the feed fluid is heated directly and rapidly by mixing with the hot, oxidant-rich recycle fluid. In this manner the use of costly heaters or heat exchangers to heat the feed fluid and the oxidant-containing fluid may be minimized or eliminated. The ratio of oxidant-rich recycle fluid vs. feed fluid is maintained such that the temperature of the feed fluid may be increased relatively quickly to start an oxidation reaction (see Example 1 below). Since the oxidation reaction is exothermic, the heat of reaction provides excess heat for later recovery, or for the recycle fluid to transfer to the pre-reaction fluid.

As the reaction fluid flows, it preferably reaches an in situ crossflow filtration attachment 11. Crossflow filtration is effective at supercritical conditions because of the low densities of the reaction fluid at these conditions. As shown in FIG. 1, the reactor may be vertically arranged so that the mixture flows downward into the reactor. A vertical arrangement is preferred but not necessary. The attachment 11 is preferably a sintered metal tube with a pre-selected pore size. A preferred pore size is about 0.05–5 microns average diameter. Smaller pore sizes are generally preferred because if the pores are small enough they will resist plugging by solid particulates (the particulates are generally too large to fill the pores; gravity and convective forces tend to dislodge the particulates from the pore openings). The solids that cannot pass through the pores settle to the funnel-shaped bottom 18 and pass through a pressure letdown valve 20. Line 5 comprises a high concentration of solids (or ash) which is cooled and treated further. After filtration, the hot filtered reaction fluid in heat exchanger 12 then comprises primarily water and dissolved gaseous products.

Figure 1:
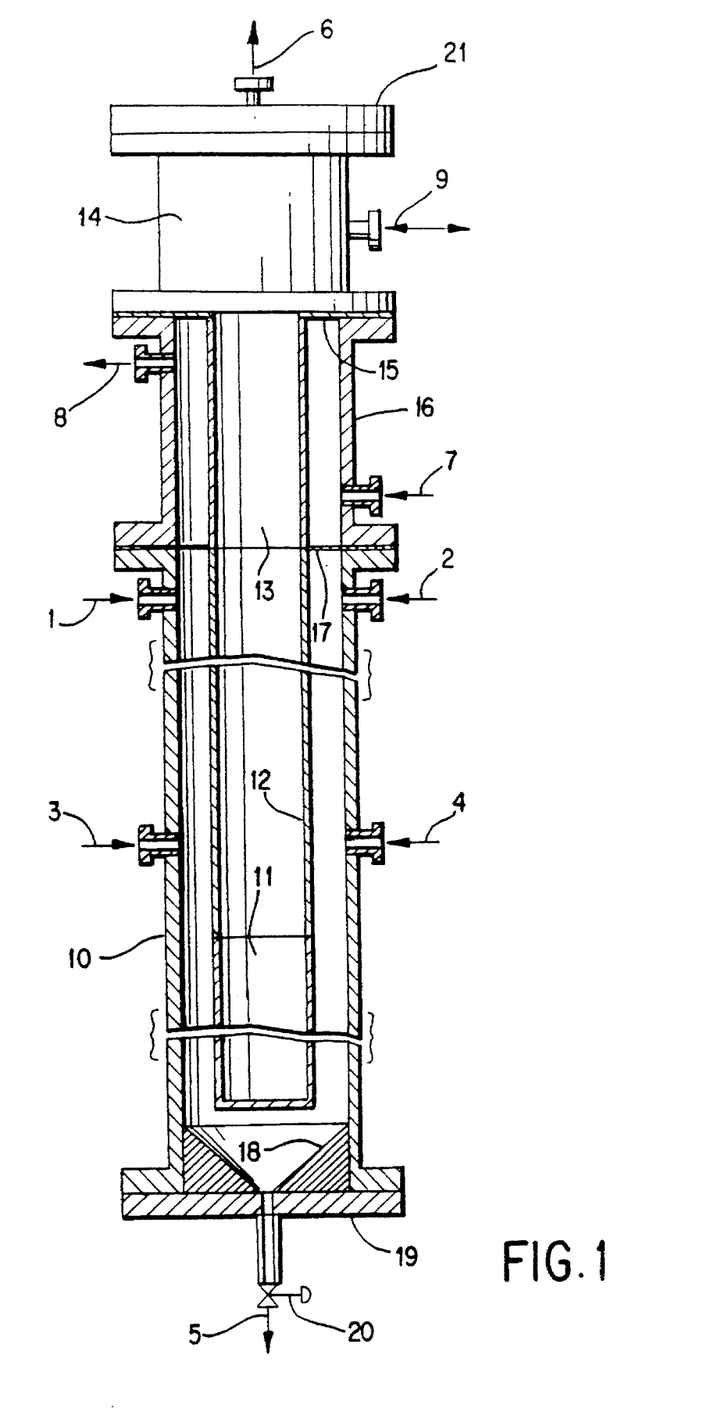
FIG. 1 is a diagram showing apparatus and process flow for a single-tube reactor arrangement.

After filtration, the reaction fluid is then preferably returned through the core (i.e. central flow chamber) of tube 12 in the opposite flow direction (as shown in the FIG. 1 embodiment this direction is upward). Preferably, a substantial amount of thermal energy in the hot reaction fluid is transferred via indirect and coaxial heat transfer to the incoming fluids (lines 1, 2, 3, and 4) in the reaction vessel 10. Further heat may be recovered from the reaction fluid in a heat exchange section 16. Preferably the heat exchange section 16 will evaporate cooling water (entering through line 7 and leaving through line 8) to steam, but other heat recovery mechanisms are also possible.

In a preferred embodiment, organic compounds are oxidized. Since the complete oxidation product of organic compounds (hydrocarbons in particular) is carbon dioxide, in a preferred embodiment the reaction fluid comprises mainly water and carbon dioxide. The phase behavior of water-carbon dioxide ($H_2O$—$CO_2$) has been well described. For example, at a pressure of about 3625 psia (about 250 bar) and a temperature of about 662° F. (about 350° C.), the $CO_2$-rich phase contains 12.0 mol % (25 wt %) $CO_2$ and the $H_2O$-rich phase contains 2.6 mol % (6.1 wt %) $CO_2$. Generally, a decrease in temperature at constant pressure increases the segregation of $CO_2$ to the $CO_2$-rich phase from the $H_2O$-rich phase. In other words, as the temperature is decreased at constant pressure the $CO_2$ tends to concentrate in the $CO_2$ phase. In subcritical conditions, the $CO_2$ segregates and concentrates as a gas as the temperature is decreased at constant pressure. Since gas thus forms in the reactor as the reaction fluid is cooled, means are employed to remove the gas prior to separating a portion of the reaction fluid to form the recycle fluid (otherwise the presence of excess pressure of $CO_2$ will tend to inhibit the oxidation reaction in the reactor).

Figure 3:
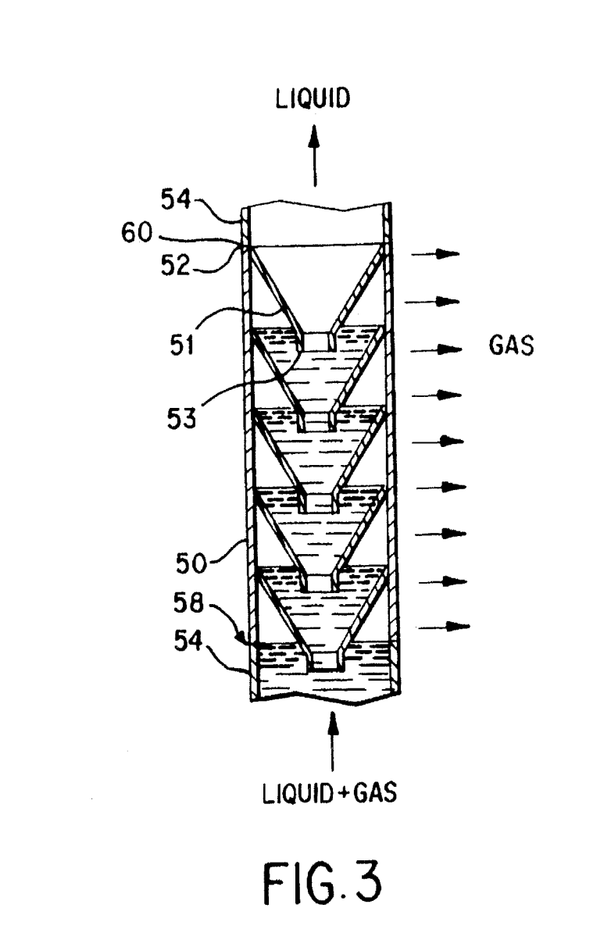
FIG. 3 is a diagram showing a vertical gas separation apparatus with several separation elements.

To remove the gas in the reaction fluid, as the reaction fluid is cooled to a subcritical temperature (but preferably not far from the critical temperature of about 705° F. (about 374° C.)), it may preferably pass through a second and preferably finer pore sized crossflow filtration attachment 13. Preferably a number of funnel shaped gas traps 51, as shown in FIG. 3, are present in the filtration attachment 13. The upper rim 52 of each gas trap is sealed to the tube wall 50, so that the gases are trapped between the tapered wall 51 and the tube wall. In this manner the gas is substantially "segregated" from the liquid in the reaction fluid stream (i.e., a two phase gas-liquid mixture results).

Tube wall 50 is a barrier that preferably comprises porous sintered materials. Due to the lower density and viscosity of the gases (as compared to the liquids present), the gases then preferentially permeate through the tube wall 50 and out of the reactor 10 through stream 8. Some liquids may also permeate the tube wall 50 in like manner, however the rate of liquid permeation will be substantially less than the rate of gas permeation due to the density and viscosity differences between the gases and the liquids present. In other words, the gases preferentially permeate faster because it is easier for gases to pass through the small pores in the tube wall 50 than it is for the heavier liquids. In this manner gas is substantially "separated" from (i.e., separated by a physical barrier) liquid in the reaction fluid.

Another way in which the separation through the sintered material may be enhanced is by a selecting a sintered material that has surface tension properties preferentially favorable to gas permeation, rather than liquid permeation. As such, in the case of liquid water in the reaction fluid, hydrophobic sintered material is preferred for this purpose. Additives or coatings to make the materials hydrophobic are well known in the art.

In FIG. 1, the remaining reaction fluid flows through the center holes of the gas traps 51, and then reaches section 14. The diameter and height of the collar 53 of each gas trap 51 may be varied to improve segregation and separation efficiency.

The rate of liquid versus gas permeation may be calibrated for each reactor. Different pore sizes and pore distributions for tube 50 may be used, depending on the specific system criteria required. Sintered materials (as discussed above for the filtration attachment 11) may be used for the tube wall 50. A preferred range for the sintered material pores for tube 50 is 0.01 to 0.2 micron average diameter. A more preferred range is 0.05 to 1.5 microns.

In addition, the gas traps 51 may comprise regular (non-sintered and thus impermeable) tubing 54 that is arranged with sintered metal tube 50 to minimize the permeation of liquid through the sintered material. The sintered metal tube 50 is thus only located where needed to allow for gas permeation. With this arrangement, the liquid level is preferably controlled at joint 58 of tubes 50 and 54 at the bottom section, and at the rims 52 of the gas traps 51 (except for the last gas trap 51 and above at the top of FIG. 3, all of which is completely filled with reaction fluid).

Figure 4:
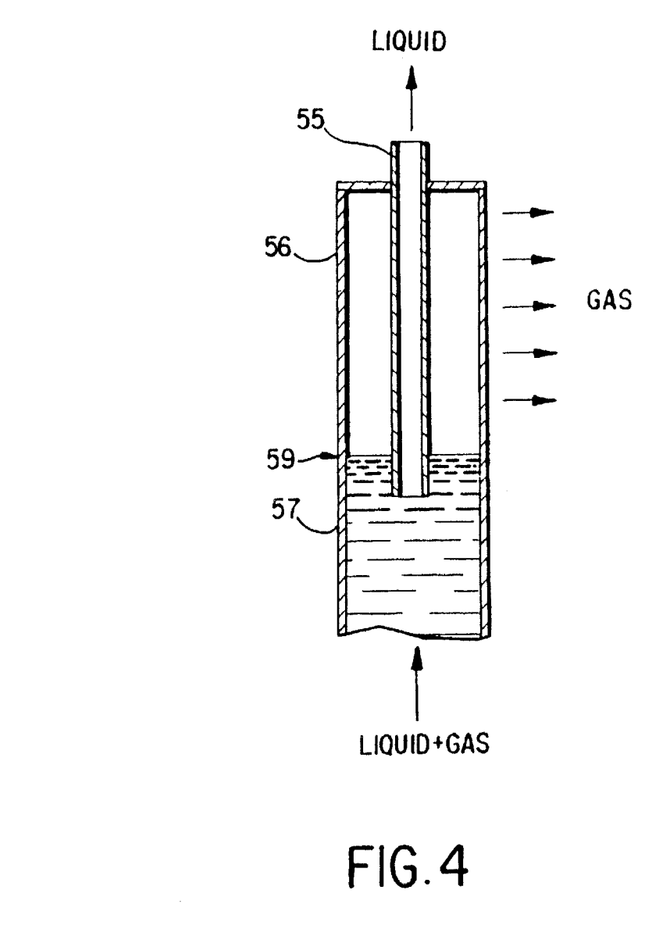
FIG. 4 is a diagram showing a single element gas separation apparatus.

FIG. 4 shows an alternative and simpler gas-liquid separator which may be incorporated in the filtration attachment 13. This design involves a single tube 55 passing through a capped sintered metal tube 56 joined at joint 59 with a regular metal tube 57. As the reaction fluid is cooled down by heat exchange across the tube 57, the gases bubble through, reach the sintered tube 56 section, and permeate through tube 56. The remaining reaction fluid is drawn through tube 55.

Figure 2:
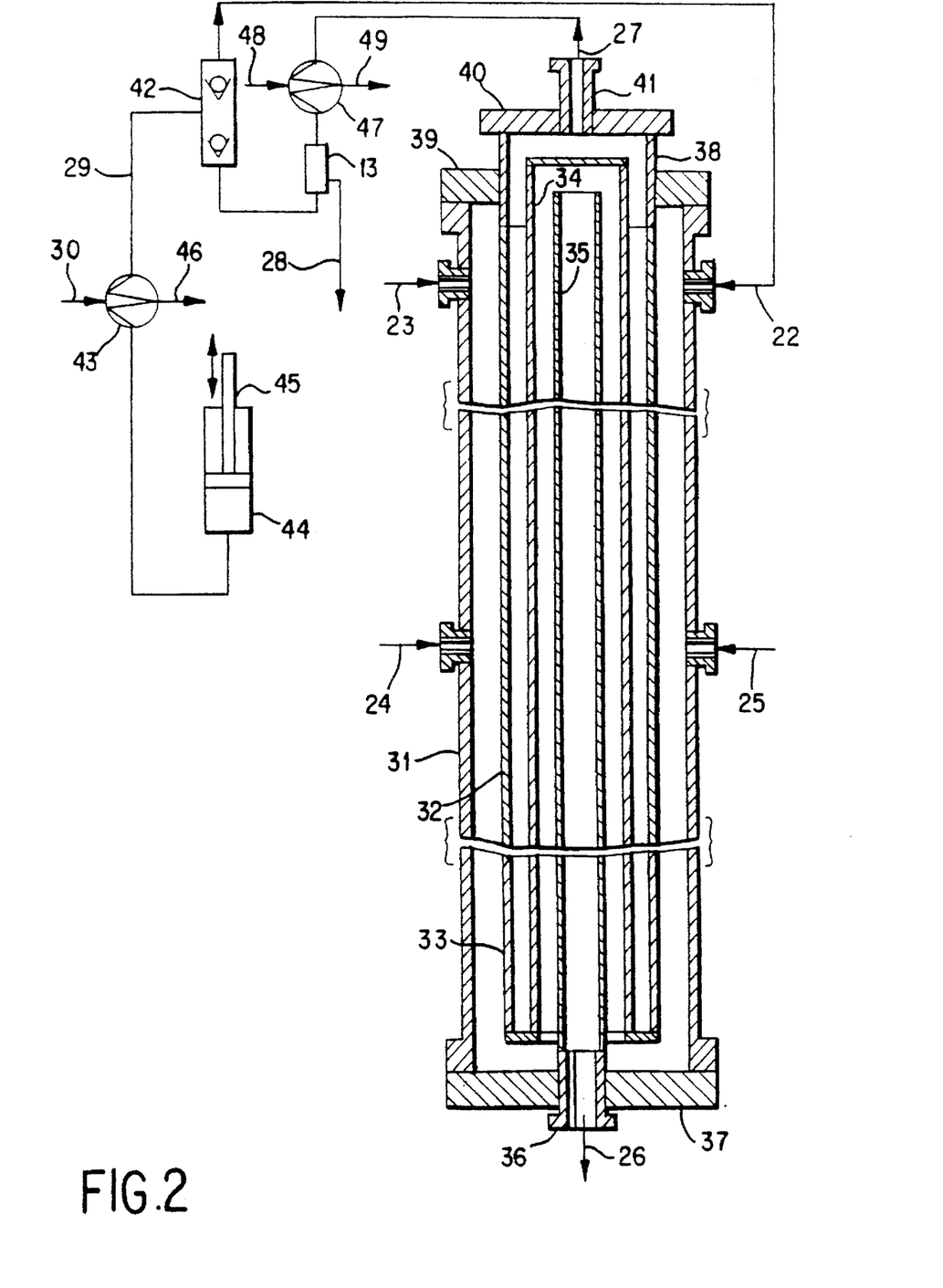
FIG. 2 is a diagram showing apparatus and process flow for a multiple-tube reactor arrangement.

Referring back to FIG. 1, section 14 schematically represents an optional pressurization means to pressurize the recycle fluid. The reaction fluid enters section 14 from filtration attachment 13 and leaves through line 6. A portion of the reaction fluid may be recycled into the reactor from line 6. One embodiment of section 14 is provided below in the apparatus and process flow descriptions for the recycle fluid pressurization system shown in FIG. 2, specifically those sections relating to equipment 29, 42, 43, 44, and 45 in FIG. 2. Line 29 in FIG. 2 represents line 9 in FIG. 1. Alternately, section 14 may just be a section of pipe, and the pressurization of recycle fluid may be accomplished by recycling a portion of line 6, using pressurization means external to the equipment shown in FIG. 1.

The system shown in FIG. 2 is but one of many possible "recycle means" to recycle a portion of the reaction mixture. Various piping and pumping arrangements may possibly be used to recycle a portion of the reaction mixture back into the reactor, including conventional reciprocating and centrifugal pumps.

Items 15 and 17 are dividers that may be used for isolation purpose. Item 19 and 21 depict flange attachments.

With reference to FIG. 2, a modified apparatus and process flow are described as follows. Through line 22, the filtered and de-gased reaction fluid may be recycled into the reactor vessel 31. This recycle fluid (through line 22) and an oxidant-containing fluid (through line 23) may be mixed and heated up by heat from counter-current heat exchange tube 32. As the mixture of recycle fluid and oxidant-containing fluid flows, it is heated via heat exchange with reaction fluid and reaches supercritical conditions for water. At some point (preferably when the mixture is at or nearly at supercritical conditions) the mixture then meets a feed stream (through line 24). The mixture mixes with the feed stream and forms a reaction fluid at supercritical conditions. Additional oxidant(s) or a second feed may be introduced through line 25, if needed.

The apparatus and process described above provide for the cold feed fluid to be heated rapidly and directly by mixing with the hot, oxidant-rich recycle fluid. The ratio of oxidant-rich recycle fluid vs. feed fluid is maintained at such a level that temperature of the feed may be increased relatively quickly to start an oxidation reaction (see Example 1 below). Hence unwanted reaction byproducts that are produced when the feed and the oxidant are together at lower temperature are reduced. As the reaction mixture flows downwards, it preferably reaches an in situ crossflow filtration attachment in the outer annular section 33 and in the inner annular section 34. In FIG. 2 the crossflow filtration attachments are represented by the double-hatched lines in sections 33 and 34. The attachments 33 and 34 preferably may comprise sintered metal tubes with a pre-selected pore size or pore size distribution. The filtered reaction fluid flows upwards through the annular section between tube section 33 and 32, and tube 34. The length of tube 33 may vary (or even be zero) depending upon the required crossflow filtration area. At a given flux, the filtration rate is approximately proportional to the filter area.

The crossflow filtration process continues as the reaction fluid flows upwards through the annular section between tube 34 and tube 35. The concentrated reaction fluid then flows downwards through tube 35. Some reaction fluid then flows through line 26, and comprises a relatively high concentration of solids (or ash) and salts. It leaves the reaction vessel for further treatment.

It is desired that the hot recycle fluid be repressurized to return it to the reactor. Present commercial pumps are generally expensive and wear relatively quickly at high temperature, supercritical, or near-supercritical water conditions. "High temperature," in this context, means at a temperature of greater than about 400° F. (about 204° C.); "near-supercritical" in this context means greater than about 650° F. (about 343° C.) but less than about 705° F. (about 374° C.). Accordingly, FIG. 2 shows a novel preferred pump assembly recycle means that pressurizes fluids at high temperatures, supercritical, or supercritical water conditions without contacting the pump to those conditions. This pump assembly is arranged using assemblies of known check valves (42), heat exchangers (43), cylinders (44), and pistons (45).

The hot reaction product fluid 27 comprises mostly water and dissolved gaseous products. It first passes through a heat exchanger 47 to cool down the stream 22 to a subcritical temperature, and then enters a gas-liquid separator similar to crossflow filtration attachment 13 in FIG. 1. The gas-liquid separator is preferably as shown in FIGS. 3 and 4, although other means to separate gas and liquid are well known in the art (e.g., settling tanks, de-misting equipment, membranes, etc.). The gas leaves the process in conduit means 28, while the remaining fluid 22 is recycled back into the vessel 31. The recycling of stream 22 may be achieved through a high temperature and high pressure dual check valve assembly 42 (or two individual check valves may be used).

In FIG. 2, a first check valve means in assembly 42 is connected to a piston 45 and cylinder 44 assembly through line 29. The fluid in line 29 moves back and forth pursuant to the pumping action of the piston 45. The reciprocating action of the piston 45 is transmitted via the fluid-filled line 29 to the chamber within pump assembly 42 that is between the first check valve and the second check valve, and then through a second check valve in assembly 42. With every stroke of the piston 45 a portion of the fluid in line 29 is pushed into line 22 and a portion of the fluid from line 27 is drawn into line 29. In this manner pressurized recycle fluid is provided in line 22.

The content in line 29 near the piston assembly may be further cooled by the attached heat exchanger 43 so that liquid water is maintained in the piston assembly. The heat exchanger 43 tends to (1) increase the pumping efficiency because water at low temperature is much more incompressible, and (2) recover heat when the cool fluid 30 (preferably water) is converted into vapor 46 (preferably steam). In addition, the heat exchanger 43 maintains the piston 44 and cylinder 45 in a lower temperature environment, which lowers both capital and maintenance costs for the described system.

Alternately, the piston 44 and cylinder 45 may pump ambient or heated liquid (e.g. water) from another source (not shown) into line 29 to pressurize the liquid in assembly 42. In this manner the liquid in assembly 42 is still pressurized and the piston 44 and cylinder 45 are not contacted with high temperature, or near-supercritical water. The selection of materials to build the pressure vessels and the attachments (other than the previously described crossflow filtration attachments) is well known in the art.

The recycle fluid in line 22 generally carries a substantial amount of thermal energy which may be transferred to stream 23 and then the streams 24 and 25 in the reaction vessel 31. The preferred recycle ratio (stream 22 vs. stream 24) is further described in Example 1. Items 36, 37, 38, 39, 40, and 41 are tube and flange attachments suitable for high pressure and high temperature operation.

The sintered materials used for the crossflow filtration elements may also act as suitable catalysts for the reactions taking place within the reactor. The large surface area of the sintered materials may contribute to the catalytic effect of these elements because most wet oxidation processes are catalyzed through the heterogeneous reaction mechanisms existing between the process fluid and the reactor surface. Preferred sintered materials are noble metals, ceramics transition metals, metal oxides, or metal alloys. More preferred sintered materials are stainless steel (316L, 321, 347), Hastelloy, Inconel, titanium, manganese oxide, cerium oxide, platinum, ruthenium, or mixtures thereof. The sintered materials are preferably mounted on a substrate, in a manner similar to the way platinum catalysts are mounted for automobile catalytic converters. It is believed that the combination of the high surface area of the sintered materials, together with the low densities of reactants at supercritical conditions, is the feature that makes sintered materials suitable catalysts at supercritical conditions.

EXAMPLE 1—RECYCLING MASS RATIO

The mass ratio (R) of the recycle fluid vs. the feed fluid affects temperature at the mixing zone. Since water generally has the largest specific heat capacity among the major components involved (such as oxygen and carbon dioxide), it is reasonable to use the properties of water for a first and conservative approximation. In particular, enthalpy of water from National Institute of Standards and Technology ("NIST") Standard Reference Database 10 is used to calculate the temperature of the mixture of feed and recycle fluid ("$T_M$"). It is further assumed that the temperatures of the feed and recycle fluids are 70° F. and 850° F. (about 21° C. to 454° C.), respectively, and both fluids are at a pressure of about 3500 psi (about 241 bar). The enthalpy of the mixture of these two fluid streams ("$H_M$") at a given recycle mass ratio R is $H_M = H_f/(1+R) + H_r R/(1+R)$, where $H_f$ and $H_r$ are enthalpy (at 3500 psi (about 241 bar)) of the feed and recycle streams, respectively. The calculated results for a range of mass ratios are shown in Table 1.

Based on the results in Table 1, the mixture temperature is practically limited to a range of about 500° F. to 700° F. (about 260° C. to 371° C.) at the specified fluid temperatures and pressure. Otherwise, the ratio R may become too large to make the operation practicable. A mixture temperature of 500°–700° F. (about 260° C. to 371° C.) as shown in Table 1 correspond to a recycle mass ratio of approximately 0.5 to 1.5. Practically, if the recycle mass ratio is less than 0.5 the mixture temperature at the feed port will be below about 500° F. (about 260° C.), which is usually not high enough to boost the oxidation reaction. However, if a mixture temperature of greater than about 700° F. (about 371° C.) is desired, a recycle mass ratio of greater than 1.5 is generally required. In such a case the pumping energy for recycling becomes cost prohibitive.

TABLE 1

Mixture Temperature and Mass Ratio Relation at 3500 psi (about 241 bar)

| Mixture Temperature ($T_M$) | | Mass Ratio (R) |
| --- | --- | --- |
| °F. | (°C.) | lb. Recycle/lb. Feed |
| 500 | (260) | 0.550 |
| 550 | (288) | 0.672 |
| 600 | (316) | 0.826 |
| 650 | (343) | 1.040 |
| 700 | (371) | 1.450 |
| 750 | (399) | 6.690 |
| 800 | (427) | 18.500 |

EXAMPLE 2—THRESHOLD FEED CONCENTRATION FOR AUTOGENIC WET OXIDATION CONDITIONS

Energy balance calculations for autogenic (i.e. self-sustaining) wet oxidation conditions requires heat values of the components involved. As given in Table 2, the heat value (amount of heat generated upon complete oxidation) of different materials varies considerably. However, the heat value expressed as the heat delivered per pound of oxygen consumed in the oxidation tends to remain basically constant (5300–6300 BTU/lb $O_2$) (about 12296–14616 KJ/Kg).

TABLE 2

Threshold Feed Concentration for Autogenic Wet Oxidation Conditions

| Material | Heat Value | | lb. $O_2$ per lb. Material | Heat Delivered | |
| --- | --- | --- | --- | --- | --- |
| | BTU/lb. | (KJ/Kg) | | BTU/lb. $O_2$ | (KJ/Kg $O_2$) |
| Acetic acid | 6270 | (14546) | 1.07 | 5860 | (13595) |
| Pyridine | 14950 | (34684) | 2.53 | 5909 | (13709) |
| Fuel oil | 19376 | (44952) | 3.26 | 5944 | (13790) |

TABLE 2-continued

<table>
<tr><th rowspan="2">Material</th><th colspan="5">Threshold Feed Concentration for Autogenic Wet Oxidation Conditions</th></tr>
<tr><th colspan="2">Heat Value</th><th>lb. O₂ per</th><th colspan="2">Heat Delivered</th></tr>
<tr><td></td><td>BTU/lb.</td><td>(KJ/Kg)</td><td>lb. Material</td><td>BTU/lb. O₂</td><td>(KJ/Kg O₂)</td></tr>
<tr><td>Lactose</td><td>7100</td><td>(16472)</td><td>1.13</td><td>6283</td><td>(14577)</td></tr>
<tr><td>Carbon</td><td>14093</td><td>(32696)</td><td>2.66</td><td>5298</td><td>(12291)</td></tr>
<tr><td>Sewage sludge (primary)</td><td>7820</td><td>(18142)</td><td>1.33</td><td>5862</td><td>(13600)</td></tr>
<tr><td>Sewage sludge (activated)</td><td>6540</td><td>(15173)</td><td>1.19</td><td>5496</td><td>(12751)</td></tr>
</table>

Threshold feed concentrations for autogenic wet oxidation of several materials are calculated based on 1 lb, of a given material and the amount of oxygen required for complete oxidation. See Table 3 below. The following assumptions are made in the energy balance calculation: (1) the highest temperature in the reaction zone is 850° F. (about 454° C.), (2) both feed and oxygen are at a pressure of 3500 psia (about 241 bar) (pumping energy is not considered—i.e., the energy required to pump the feed fluid and oxygen to the pressure is neglected in the calculation), (3) the enthalpy changes of the organic material and oxygen are approximated by that of water, and (4) energy loss to environment is neglected. For example, 1.07 lb. (Kg) of oxygen is required to completely oxidize 1 lb. (Kg) of acetic acid. Since the energy required for raising water temperature from 70° F. to 850° F. (21° C. to 454° C.) at 3500 psi (241 bar) is 1138.6 BTU/lb (2641.6 KJ/Kg) (see NIST Standard Reference Database 10), the energy required for heating 1 lb acetic acid plus 1.07 lb oxygen from 70° F. to 850° F. (21° C. to 454° C.) at 3500 psi (241 bar) is approximately 2356.9 BTU (about 5468 KJ) (i.e. 2.07×1138.6 BTU) (2.07×2641.6 KJ). In the case of no energy recovery, 3913.1 BTU (9078.4 KJ) (i.e., 6270 BTU minus 2356.9 BTU) (14546 KJ minus 5468 KJ) of thermal energy will be available for heating. If energy recovery is considered, a given percent of heat value of the materials being oxidized (for example, acetic acid) is added to the available thermal energy for heating water in the feed. The calculated threshold feed concentrations for autogenic oxidation of various materials are given in Table 3.

TABLE 3

<table>
<tr><th rowspan="3">Material</th><th colspan="3">Threshold Feed Concentration for Autogenic Wet Oxidation Conditions</th></tr>
<tr><th colspan="3">Threshold Feed Concentration (wt %)</th></tr>
<tr><th>0% E.R.*</th><th>25% E.R.</th><th>50% E.R.</th></tr>
<tr><td>Acetic acid</td><td>25.1</td><td>19.0</td><td>15.3</td></tr>
<tr><td>Pyridine</td><td>10.5</td><td>8.0</td><td>6.4</td></tr>
<tr><td>Fuel oil</td><td>8.1</td><td>6.1</td><td>5.0</td></tr>
<tr><td>Lactose</td><td>21.7</td><td>16.6</td><td>13.4</td></tr>
<tr><td>Carbon</td><td>11.5</td><td>8.7</td><td>6.9</td></tr>
</table>

*E.R.-Energy recovery (the percentage is based on the heat value of a given material).

Based on Table 3, it is apparent that as the amount of E.R. is increased, then less organic compounds to be oxidized are needed in the feed to reach autogenic reaction conditions. Thus, persons skilled in the art will be able to calculate minimum feed conditions for various specific autogenic processes, and apply them as disclosed in this specification.

To start the unit initially, it will usually be necessary to provide external heating means to heat the recycle fluid for starting purposes. Such heating means are well-known in the act. It is preferable to utilize a clean source of initial recycle fluid (e.g., water) so that the starting external heating means does not become fouled with scale, char, or reaction products from such recycle fluid.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein or in the steps or in the sequence of steps of the methods described herein without departing from the spirit and scope of the invention as described in the following claims. Similarly, isomers and homologs of reactants may be used and still come within the scope of the invention.

We claim:

1. A method of treating an aqueous stream containing oxidizable matter which comprises:

mixing a cold aqueous stream containing oxidizable matter with a hot oxidant-containing stream and reacting the resultant mixture under supercritical conditions for water in a reaction zone to form a product stream including water;

heating said mixture by indirect heat exchange with the product stream;

condensing water in the product stream to form a hot condensate comprising water; and recycling at least a portion of the hot condensate to mix with and heat the oxidant-containing stream prior to that stream mixing with the cold aqueous stream containing oxidizable matter.

2. A method of removing oxidizable matter from a waste water stream which comprises the steps of:

(a) mixing a cold waste water stream with a hot oxidant-containing stream and allowing the resultant mixture to react in a reaction zone at supercritical conditions for water for a time sufficient to oxidize oxidizable matter to an oxidation product stream including water and carbon dioxide;

(b) cooling the product stream by indirect heat exchange with said mixture in the reaction zone to form a hot condensate stream comprising water; and (c) recycling at least a portion of the hot condensate stream to mix with and heat the oxidant-containing fluid stream prior to step (a).

3. A method of oxidizing a compound comprising:

mixing a recycle fluid with a first oxidant-containing fluid to form a pre-reaction fluid;

mixing the pre-reaction fluid with a cold feed fluid that comprises a compound to be oxidized to form a reaction fluid that is then reacted at supercritical conditions for water;

separating a portion of the reaction fluid to form the recycle fluid; and crossflow filtering solids from the pre-reaction fluid or the reaction fluid.

4. A method of oxidizing a compound comprising:

mixing a recycle fluid with a first oxidant-containing fluid to form a pre-reaction fluid;

mixing the pre-reaction fluid with a feed fluid that comprises a compound to be oxidized to form a reaction fluid is then reacted at supercritical conditions for water;

separating a portion of the reaction fluid to form the recycle fluid; and crossflow filtering solids from the pre-reaction fluid or the reaction fluid wherein the crossflow filtering is through a sintered filter.

5. A method of oxidizing a compound comprising:

mixing a recycle fluid with a first oxidant-containing fluid to form a pre-reaction fluid;

mixing the pre-reaction fluid with a cold feed fluid that comprises a compound to be oxidized, to form a reaction fluid that is then reacted at supercritical conditions for water;

separating a portion of the reaction fluid to form the recycle fluid; and separating gas from the reaction fluid by preferentially permeating gas crossflow filtering solids from the pre-reaction fluid or the reaction fluid through a sintered material.

6. A method of oxidizing a compound comprising:

mixing a recycle fluid with a first oxidant-containing fluid to form a pre-reaction fluid;

mixing the pre-reaction fluid with a cold feed fluid that comprises a compound to be oxidized to form a reaction fluid that is the reacted at supercritical conditions for water;

separating a portion of the reaction fluid to form the recycle fluid;

separating gas from the reaction fluid by preferentially permeating gas through a sintered material; and mixing a second oxidant-containing fluid with the pre-reaction fluid or the reaction fluid.

7. A method of oxidizing a compound comprising:

mixing a recycle fluid with a first oxidant-containing fluid to form a pre-reaction fluid;

mixing the pre-reaction fluid with a cold feed fluid that comprises a compound to be oxidized to form a reaction fluid that is then reacted at supercritical conditions for water;

separating a portion of the reaction fluid to form the recycle fluid;

pressurizing the recycle fluid by withdrawing the recycle fluid from an upstream portion of the recycle path;

isolating the withdrawn recycle fluid from the upstream portion; and pressurizing the isolated recycle fluid into a downstream portion of the recycle path.

8. A method of oxidizing a compound comprising: mixing a recycle fluid with a first oxidant-containing fluid to form a pre-reaction fluid;

mixing the pre-reaction fluid with a cold feed fluid that comprises a compound to be oxidized to form a reaction fluid that is then reacted at supercritical conditions for water;

separating a portion of the reaction fluid to form the recycle fluid;

pressurizing the recycle fluid by withdrawing the recycle fluid from an upstream portion of the recycle path;

isolating the withdrawn recycle fluid from the upstream portion;

pressurizing the isolated recycle fluid into a downstream portion of the recycle path;

wherein recycle fluid is withdrawn in a fluid system separately pressurizable from the recycle path.

9. A method of oxidizing a compound comprising:

mixing a recycle fluid with a first oxidant-containing fluid to form a pre-reaction fluid;

mixing the pre-reaction fluid with a cold feed fluid that comprises a compound to be oxidized to form a reaction fluid that is then reacted at supercritical conditions for water;

separating a portion of the reaction fluid to form the recycle fluid;

pressurizing the recycle fluid by withdrawing the recycle fluid from an upstream portion of the recycle path;

isolating the withdrawn recycle fluid from the upstream portion;

pressurizing the isolated recycle fluid into a downstream portion of the recycle path;

cooling the withdrawn recycle fluid;

wherein the withdrawn recycle fluid is withdrawn in a fluid system separately pressurizable from the recycle path.

* * * * *

UNITED STATES PATENT AND TRADEMARK OFFICE
CERTIFICATE OF CORRECTION

PATENT NO. : 5,454,950
DATED : October 3, 1995
INVENTOR(S) : Li, et. al.

It is certified that error appears in the above-indentified patent and that said Letters Patent is hereby corrected as shown below:

Title page, item [54] and col. 1, line 8, delete the term "PRESSURIZATIION" and insert the term --PRESSURIZATION-- therefor.

Column 14, Claim 8, line 17, delete "comprising: mixing" and insert-- comprising: mixing--therefor.

Signed and Sealed this

Twelfth Day of December, 1995

Attest:

Attesting Officer

BRUCE LEHMAN

Commissioner of Patents and Trademarks